United States Patent
Rail

(10) Patent No.: US 6,275,844 B1
(45) Date of Patent: Aug. 14, 2001

(54) AUTOMATICALLY MAINTAINING APPLICATIONS IN A COMPUTER SYSTEM USING A CHECK-IN TIME

(75) Inventor: Peter D. Rail, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 08/794,611

(22) Filed: Feb. 3, 1997

(51) Int. Cl.[7] ................................................ G06F 9/00
(52) U.S. Cl. ................................................... 709/102
(58) Field of Search ............................. 709/100, 102, 709/103, 104, 106, 107, 1, 203

(56) References Cited

U.S. PATENT DOCUMENTS

| | | | |
|---|---|---|---|
| 4,816,989 | * | 3/1989 | Finn et al. . |
| 5,204,897 | * | 4/1993 | Wyman ................................ 380/4 |
| 5,260,999 | * | 11/1993 | Wyman ................................ 380/4 |
| 5,438,508 | * | 8/1995 | Wyman ................................ 705/8 |
| 5,511,188 | * | 4/1996 | Pascucci et al. ................... 707/203 |
| 5,608,643 | * | 3/1997 | Wichter et al. ............... 364/479.14 |
| 5,742,668 | * | 4/1998 | Pepe et al. ........................ 455/415 |
| 5,742,905 | * | 4/1998 | Pepe et al. ........................ 455/461 |
| 5,872,588 | * | 2/1999 | Aras et al. ........................... 348/1 |
| 5,902,352 | * | 5/1999 | Chou et al. ........................ 709/102 |

* cited by examiner

*Primary Examiner*—Majid Banankhah
(74) *Attorney, Agent, or Firm*—Baker, Botts, LLP

(57) ABSTRACT

A maintenance system (10) is provided for maintaining applications (14) in a computer system. The maintenance system (10) includes a database (28, 36) which stores a check-in entry (22) associated with an application (14) and configuration information (40). A processor (24, 26), coupled to the database (28, 36), determines whether a check-in time for the application (14) associated with the check-in entry (22) is later than a specified time. If such is the case, then the processor (24, 26) deactivates the application (14). The processor (24, 26) also functions to start the application (14) associated with the check-in entry (22) if the application (14) is not running.

20 Claims, 3 Drawing Sheets

AUTOMATICALLY MAINTAINING APPLICATIONS IN A COMPUTER SYSTEM USING A CHECK-IN TIME

TECHNICAL FIELD OF THE INVENTION

This invention relates generally to maintenance systems, and more particularly, to automatically maintaining applications in a computer system.

BACKGROUND OF THE INVENTION

Typically, a number of software applications can be run on a computer system during its operation. Because network problems, unstable vendor software, bugs within an application, conflicts with other applications, or the like, may cause one or more of these applications to fail, the applications must be maintained in order to ensure proper operation of the computer system.

Previous techniques and systems for maintaining applications in a computer system were problematic for various reasons. For example, according to one technique, a system administrator was required perform the required maintenance, for example, by manually deactivating and/or restarting applications in response to a failure. Such work was both time-consuming and an inefficient use of the administrator. Furthermore, for a network comprising a plurality of computers, the system administrator was required to log onto each computer separately in order to perform the necessary maintenance.

SUMMARY OF THE INVENTION

In accordance with the present invention, the disadvantages and problems associated with maintaining applications in a computer system have been substantially reduced or eliminated.

In accordance with one embodiment of the present invention, a maintenance system is provided for maintaining applications in a computer system. The maintenance system includes a database which stores a check-in entry associated with an application. A processor, coupled to the database, determines whether a check-in time for the application associated with the check-in entry is later than a specified time. If such is the case, then the processor deactivates the application.

In accordance with another embodiment of the present invention, a system is provided for maintaining applications in a computer system. The maintenance system includes a database which is operable to store a check-in entry associated with an application and configuration information for the application. A processor is coupled to the database. The processor is operable to determine whether a check-in time for the application associated with the check-in entry is later than a specified time, deactivate the application associated with the check-in entry if the check-in time is later than the specified time, and start the application associated with the check-in entry if the application is not running.

In accordance with yet another embodiment of the present invention, a method is provided for maintaining applications in a computer system. In the method, a check-in entry associated with an application is generated. If a check-in time for the application associated with the check-in entry is later than a specified time, then such application is deactivated.

Important technical advantages of the present invention include automatically maintaining applications in a computer system. This is accomplished by requiring that each application in the computer system periodically check-in with a check-in database. A deactivator module reviews the check-in database at predetermined intervals of time. If an application has not checked-in, the deactivator module deactivates the application. A starter module starts or restarts any applications that are not currently running, such as, for example, those which have crashed or have been deactivated. Accordingly, the applications on a computer system can be maintained during operation.

Another important technical advantage of the present invention includes providing multiple modules which operate independently to maintain applications on a computer. These modules may include a deactivator module and a starter module. Because the modules operate independently, implementation of a maintenance system is simplified because coding and/or hardware is not required to support the coordinated operation of the modules. Furthermore, if one module fails, the operation of the remaining module or modules is not affected.

Yet another technical advantage of the present invention includes providing a centralized location for the administration of a maintenance system which supports a computer system comprising a plurality of computers. This is accomplished by operating separate maintenance modules on each computer in the computer system, but accessing and storing configuration information for these modules in a service locator and configuration database maintained on only one of the computers. A systems administrator can interact with the maintenance system, for example, to input or change the configuration information, from the central computer, and, accordingly, is not required to log onto each individual computer separately.

Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals used for like and corresponding parts of the various drawings.

Figure 1:
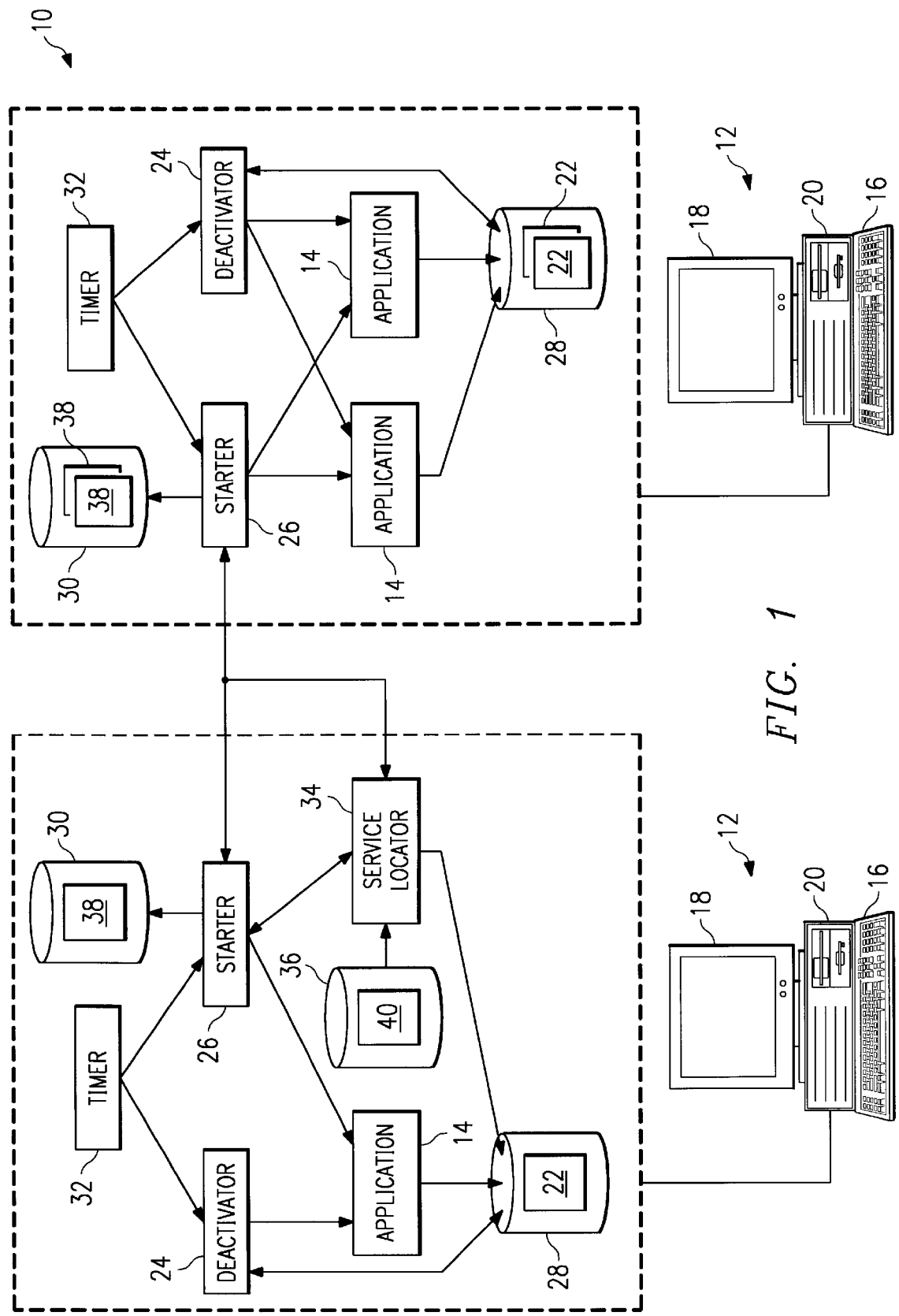
FIG. 1 illustrates a system for maintaining applications in a computer system, in accordance with an embodiment of the present invention.

FIG. 1 illustrates a system 10 for maintaining one or more applications 14 on a computer system, such as, for example, a UNIX™ system, comprising one or more computers 12. These computers 12 may be connected via a local area network (LAN), wide area network (WAN), or any other suitable connection.

Maintenance system 10 may operate on the one or more computers 12 of the computer system. Each computer 12 includes an input device 16, such as a keypad, touch screen, or other device that can accept information. An output device 18 conveys information associated with the operation of maintenance system 10, including digital data, visual information, or audio information. Both input device 16 and output device 18 may include fixed or removable storage media, such as magnetic computer disk, optical disk, CD-ROM, or other suitable media to both receive output from and provide input to maintenance system 10. One or more processors 20 and their associated memories execute instructions and manipulate information in accordance with the operation of maintenance system 10 as described herein.

As shown, each computer 12 may run at least one application 14, which can be the same as or different from the application(s) 14 run on other computers 12. Each application 14 can be any suitable software application for supporting one or more functions (e.g., data retrieval, processing, forwarding, etc.) in the computer 12 on which the application is run.

Each application 14 may include appropriate coding to support a check-in function during which the application "checks in" with maintenance system 10. Preferably, the check-in function is performed at a predetermined interval, which can be the same or different for each application 14. This check-in interval can be five minutes, ten minutes, or any other suitable interval. In one embodiment, the interval for each application 14 can be configured by a user, such as a system administrator, based on various factors, such as memory capacity within the computer system, the complexity of each application 14, and historical failures of each application 14. During the check-in operation, each application 14 generates a separate check-in entry 22. Each check-in entry 22, which can be a file, may comprise a time stamp specifying the time of its creation or check-in. Each check-in entry 22 also includes executable deactivator coding which can cause the corresponding application 14 to deactivate or shut down. This deactivation may be abrupt or gradual.

In addition to the coding which supports check-in, each application 14 also includes starter coding which ensures that only one copy of that application is running on a particular computer 12 at any time. This coding may be executed whenever the application 14 is started or restarted on a computer 12.

For each computer 12 in the computing system, maintenance system 10 includes a deactivator module 24, a starter module 26, a check-in database 28, a retry log database 30, and a timer module 32. Also, a service locator module 34 and a configuration database 36 are preferably contained in one of computers 12.

Each check-in database 28 may reside in a suitable storage medium, such as random access memory (RAM), disk storage, or other suitable volatile data storage system, preferably within the corresponding computer 12. Each check-in database 28, which may be a relational database, receives, stores, and forwards check-in entries 22 generated by applications 14 during the check-in operation. As described above, each check-in entry 22 may include a time stamp which specifies when the check-in entry 22 was created. In one embodiment, the time of creation coincides with the time at which the application 14 "checked-in" with check-in database 28.

Each deactivator module 24 is coupled to a corresponding check-in database 28. The functionality of each deactivator module 24 may be performed by a processor, such as a main-frame, file server, work station, or other suitable data processing facility running appropriate software.

Deactivator modules 24 function primarily to deactivate applications 14 when certain conditions occur. More specifically, at predetermined intervals, each deactivator module 24 sweeps the corresponding check-in database 28. Preferably, these sweeping intervals are staggered with the check-in intervals at which applications 14 check-in with the check-in database 28. During each sweep, a deactivator module 24 reviews the check-in entries 22 contained within the corresponding check-in database 28 in order to identify which applications 14 have checked-in. If an application 14 has not checked-in during the appropriate check-in interval for that application, then the deactivator module 24 deactivates that application 14. This is accomplished by executing the deactivator coding within the check-in entry 22 corresponding to that application 14. In one embodiment, in order to determine whether an application 14 has checked-in during the appropriate interval, a deactivator module 24 compares the time stamp in the check-in entry 22 corresponding to that application 14 against a specified time for check-in associated with the application.

Each starter module 26 operates on a particular computer 12 to start any computing application 14 which should be running on such computer, but currently is not running. The functionality of each starter module 26 can be performed by a processor, such as a main-frame, file server, work station, or other suitable data processing facility running appropriate software. This processor may be the same or separate from that processor which performs the functionality for the deactivator module 24 operating on the same computer 12 as the starter module 26. Like deactivator modules 24, starter modules 26 may each perform functions at a predetermined interval, such as every five minutes, ten minutes, fifteen minutes, or any other suitable interval. Preferably, such interval is configurable.

Each starter module 26 may generate a retry log 38 for each application 14 on the corresponding computer 12. A retry log 38 specifies all the times at which the associated application 14 is restarted during a certain period of time, such as daily, biweekly, weekly, monthly, or any other suitable period. Preferably, a new retry log 38 is generated at the beginning of each period. After an application 14 has been started more than a specified number of times during a certain period, starter module 26 will no longer start such application 14. Instead, starter module 26 may generate an alarm and message which is directed to a human operator, such as system administrator. The message, which may include the retry log 38 associated with the application 14, can be transmitted via electronic mail to such human operator so that appropriate action may be taken. For example, an application 14 which has a coding bug may crash multiple times. It would then be desirable to have a human operator review such application in order to make changes to the coding or copy a new version if appropriate. Accordingly, an application which is especially problematic will not be continuously restarted.

Each starter module 26 operates independently of the deactivator module 24 on the same computer 12. Accordingly, the implementation of maintenance system 10 is simplified because coding and/or hardware is not required to support the coordinated operation of these two modules. Furthermore, if one of the deactivator module 24 or the starter module 26 fails, the operation of the other module is not affected.

Each retry log database 30 is maintained on a particular computer 12 and may be coupled to a corresponding starter module 26 on the same computer. Each retry log database 30 resides in a suitable storage medium, such as RAM, disk storage, or other suitable volatile data storage system, which can be the same or separate from the data storage system containing the check-in database 28 on the same computer 12. Each retry log database 30 can be a relational database. Retry log databases 30 function primarily to store the retry logs 38 generated by the corresponding starter modules 26. For a particular computer 12, the retry log database 30 maintains a separate retry log 38 for each application 14 which should be running on that computer 12.

A separate timer module 32 is also provided on each computer 12 of the computer system. Each timer module 32 is coupled to the deactivator module 24 and the starter module 26 operating on the same computer 12. The functionality of each timer module 32 can be performed by a processor, such as a main-frame, file server, work station, or other suitable data processing facility running appropriate software. This processor may be the same or separate from that processor or those processors which performs the functionality for the associated deactivator module 24 and starter module 26. In one embodiment, a timer module 32 may comprise the CRON™ clock feature of a UNIX™-based computer system.

Timer modules 32 function primarily to activate the corresponding deactivator modules 24 and starter modules 26 at the appropriate intervals. For each computer 12, the predetermined interval for deactivator module 24 may be the same or different from the interval for starter module 26. Also, the intervals can be the same duration, but staggered to begin and end at different times.

Preferably, a single service locator module 34 is provided for maintenance system 10 and contained on one of computers 12. The functionality of service locator module 34 may be performed by a processor, such as a main-frame, file server, work station, or other suitable data processing facility running appropriate software. Service locator module 34 is coupled to an interface having a suitable input device 16, such as a keypad, touch screen, input port, or other suitable device that can accept information, and one or more suitable output devices 18, such as a computer display or output port, for conveying information associated with the operation of maintenance system 10, including digital data, visual information, or audio information.

Service locator module 34 provides centralized administration of maintenance system 10. Service locator module 34 is coupled, and provides configuration information 40, to each starter module 26 of maintenance system 10. Configuration information 40 may specify, among other things, all applications 14 which should be running on each computer 12, check-in intervals for each application 14, retry limits for each application 14, human operators (e.g., system administrators) who should be contacted in case an application 14 exceeds its retry limit, and e-mail addresses for such human operators. Service locator module 34 may also function to allow a user to update the configuration information regarding the applications 14 on each computer 12.

Configuration database 36 is coupled to service locator module 34. Preferably, a single configuration database 36 is provided for maintenance system 10 and is included in only one computer 12, which can be the same or a different from the computer 12 on which the service locator module 34 is provided. The configuration database 36 may reside in a suitable storage medium, such as RAM, read-only memory (ROM), disk, tape storage, or other suitable volatile or non-volatile data storage system, which can be the same or separate from the data storage system containing check-in database 28 and/or retry log database 30. Configuration database 36 primarily functions to store configuration information 40.

Generally, in operation, configuration information 40 for a computer system is input into maintenance system 10 via service locator module 34 and stored in configuration database 36. For each computer 12, the starter module 26 on the computer 12 receives the configuration information 40 from service locator module 34 and utilizes this information to configure that portion of maintenance system 10 which operates on the computer. Afterwards, each application 14 on the computer 12, if running, periodically checks-in to the appropriate check-in database 28 by generating a check-in file 22. Deactivator module 24 on the computer 12, upon a receiving a signal from timer module 32, reviews the check-in files 22 contained within the check-in database 28. Deactivator module 24 deactivates any application 14 which has not checked-in during the appropriate check-in interval for that application. The starter module 26 on computer 12, also upon receiving a signal from timer module 32, may restart any application 14 which should be running on the computer 12, but is not currently running. For each application 14 which is restarted, starter module 26 creates an entry to be added to a retry log 38 associated with the application 14. The retry log 38 is stored in an appropriate retry log database 30. If an application 14 must be restarted more times than the retry limit specified for that application 14, maintenance system 10 sends a message to an appropriate human operator so that appropriate action can be taken. Accordingly, the present invention maintains the computing applications 14 in a computer system.

Figure 2:
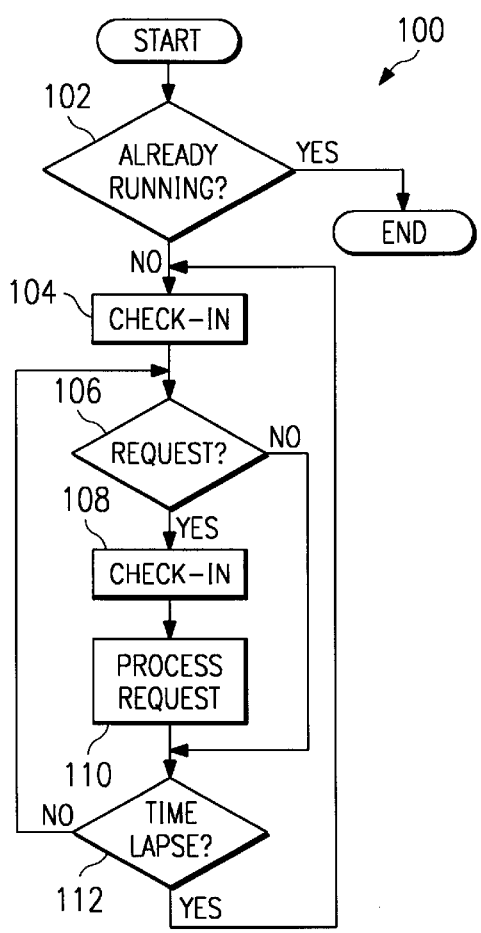
FIG. 2 is a flow chart of a method by which an application is started and periodically checks-in to a maintenance system, according to an embodiment of the present invention.

FIG. 2 is a flow chart of a method 100 by which a computing application 14 is started and periodically checks-in with maintenance system 10, according to an embodiment of the present invention. Method 100 may be supported by appropriate coding and performed as one or more routines within each application 14 running on a computer 12 in the computer system maintained by maintenance system 10.

For each application 14 running on a computer 12, method 100 is initiated when the application 14 is started or restarted, for example, by the operation of starter module 26. At step 102, the application 14 determines whether it is already running on the computer 12. If it is determined that application 14 is already running, then method 100 ends. Otherwise, application 14 checks-in with maintenance system 10 at step 104. More specifically, application 14 generates a check-in entry 22, which may include a time stamp specifying the time of check-in. Check-in entry 22 is stored in the check-in database 28 located on the computer 12.

At step 106, application 14 determines whether a request for processing has been received. Such processing request is associated with the normal processing for which the application 14 is run. For example, if application 14 is a software program for word processing, a processing request may comprise a request to make revisions to a certain document.

If it is determined that a process request has been received, application 14 checks-in to maintenance system 10 at step 108 before it performs any processing pursuant to the request. In one embodiment, a predetermined period of time is provided before application 14 must check-in again with maintenance system 10. The present invention contemplates that the predetermined time can be configurable, and thus adjusted, for example, according to the operating characteristics of each application 14. That is, the check-in period for a particular application 14 may be individually set so that such application 14 will have sufficient time to process any given request between check-in intervals (described above). For example, an application may require an average of two minutes to perform processing according to a request. A period of five minutes would thus be sufficient for the check-in period of that application. By checking-in at step 108 prior to processing, application 14 will be given the maximum amount of time to process the request.

At step 110, application 14 performs processing according to the request. Application 14 then determines whether the predetermined time between check-in intervals has lapsed at step 112. if the time has not lapsed, application 14 returns to step 106 where it determines whether another processing request has been received. On the other hand, if the time has lapsed, application 14 returns to step 104 where it checks-in with maintenance system 10.

Referring again to step 106, if it is determined that a process request has not been received, application 14 determines at step 112 whether the predetermined time between check-in intervals has lapsed at step 112. As previously described, if the predetermined time has not lapsed, application 14 returns to step 106 where it determines whether a process request has been received. Otherwise, if the predetermined time has lapsed, application 14 returns to step 104 where it checks-in with the check-in database 28.

If application 14 is operating properly, it will continue to cycle through steps 104–112 until a problem arises, such as, for example, within the application itself, the computer 12 on which it is running, or the network of computers.

Figure 3:
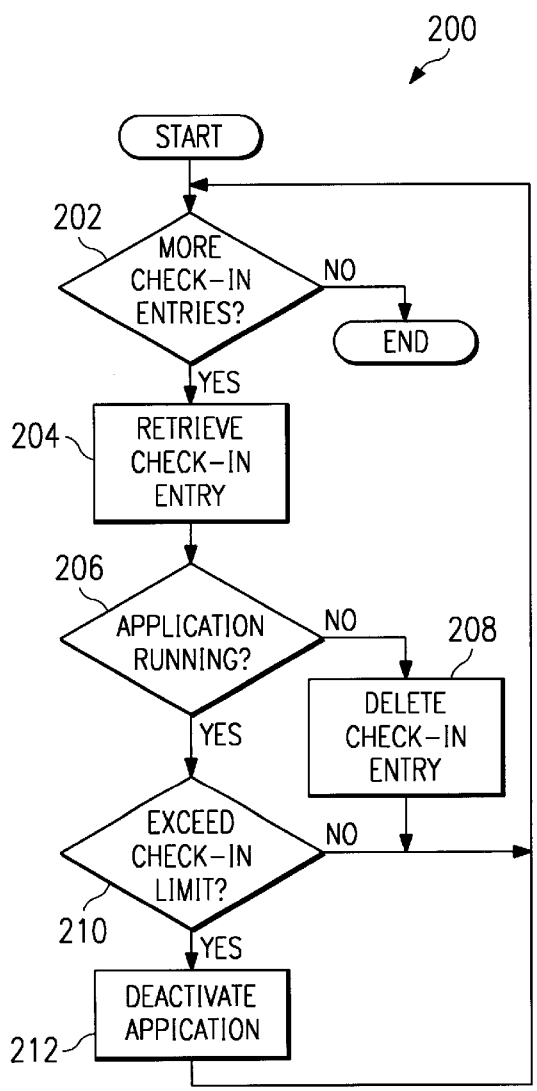
FIG. 3 is a flow chart of a method for deactivating applications in a computer system, according to an embodiment of the present invention.

FIG. 3 is a flow chart of a method 200 for deactivating an application 14, in accordance with the present invention. Method 200 corresponds to the operation of each deactivator module 24 of maintenance system 10. For a particular deactivator module 24, method 200 may be initiated when the deactivator module 24 receives a signal from an appropriate timer module 32.

Method 200 begins at step 202 where deactivator module 24 sweeps a corresponding check-in database 28 and determines whether there are any check-in entries 22 within the check-in database 28. If there are no check-in entries 22, method 200 ends.

If there are check-in entries 22 in check-in database 28, deactivator module 24 retrieves a check-in entry 22 at step 204. At step 206, deactivator module 24 determines whether the application 14 corresponding to the check-in entry is running. If such application 14 is running, deactivator module 24 deletes the check-in entry 22 at step 208. Deactivator module 24 then returns to step 202 where it determines whether there are additional check-in entries 22.

On the other hand, if it is determined at step 206 that the application 14 corresponding to the check-in entry 22 is not running, deactivator module 24 determines whether the time limit for check-in has been exceeded at step 210. In one embodiment, this is accomplished by determining whether a time stamp contained within check-in entry 22 specifies a time after an appropriate check-in time. If the time limit has not been exceeded, deactivator module 24 returns to step 202 where it determines whether there are additional check-in entries 22.

If at step 210 it is determined that the time limit for check-in has been exceeded, deactivator module 24 deactivates the corresponding application 14 at step 212. In one embodiment, the check-in entry 22 for the application 14 contains code which deactivates the application when executed; thus, deactivator module 24 may deactivate the application 14 by executing the contents of check-in entry 22. Deactivator module 24 then returns to step 202 where it determines whether there are additional check-in entries 22 in the corresponding check-in database 28.

Deactivator module 24 repeats steps 202–212 until it has processed each check-in entry 22 contained within check-in database 28. Accordingly, the present invention maintains the applications 14 in a computing system by deactivating any applications 14 which have not checked-in with an appropriate check-in database 28, and thus may have problems.

Figure 4:
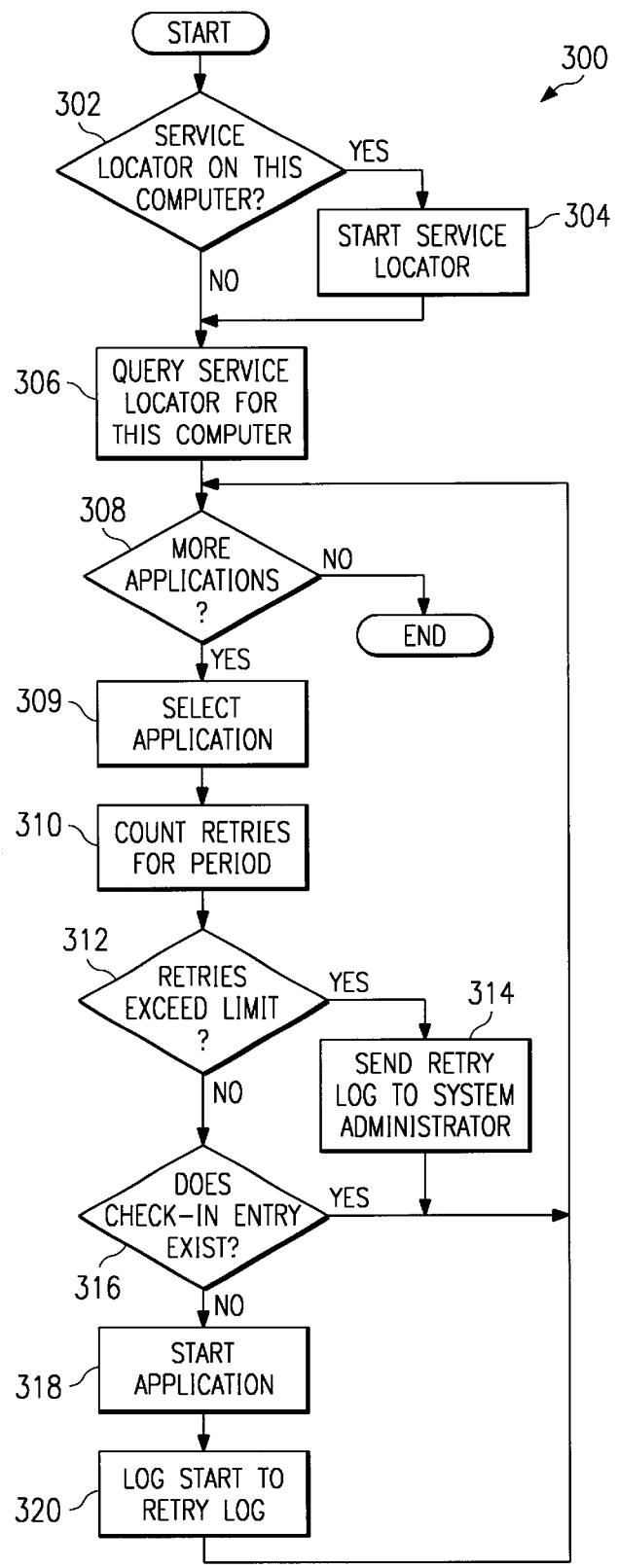
FIG. 4 is a flow chart of a method for starting applications in a computer system, according to an embodiment of the present invention.

FIG. 4 is a flow chart of a method 300 for starting one or more applications 14 in a computer system, according to the present invention. Method 300, which corresponds to the operation of each starter module 26, may be initiated upon receipt of a signal from a corresponding timer module 32.

For each starter module 26, method 300 begins at step 302 where the starter module 26 determines whether service locator module 34 for maintenance system 10 is contained within the computer 12 on which the starter module 26 is located.

If it is determined that service locator module 34 is contained on such computer 12, starter module 26 activates or starts service locator module 34 at step 304. At step 306, starter module 26 queries service locator module 34 to obtain configuration information 40 for the computer 12 on which the starter module 26 is located. This configuration information 40, which is contained within configuration database 36 coupled to service locator module 34, may specify all applications 14 which should be running on computer 12, check-in intervals for each application 14, retry limits for each application 14, human operators (e.g., system administrators) who should be contacted in case an application 14 exceeds its retry limit, and e-mail addresses for such human operators.

Referring again to step 302, if it is determined at that service locator module 34 is not located on computer 12, starter module 26 skips step 304 (where service locator module 34 is activated) and proceeds directly to step 306 in which starter module 26 queries the service locator module 34 for configuration information 40.

Utilizing the configuration information 40 received from service locator module 34, starter module 26 determines at step 308 whether there are any applications 14 which starter module 26 should consider for starting. If there are no such applications 14, method 300 ends. If, on the other hand, there are applications 14 which should be considered, starter module 26 selects one of these applications 14 at step 309.

Each application 14 has an associated retry log 38 which is maintained in a retry log database 30 coupled to the starter module 26. Each retry log 38 specifies the number of times that the associated application 14 has been started or restarted (i.e., retries) during a specified period of time (e.g., daily, biweekly, weekly, monthly, or any other suitable period). At step 310, starter module 26 counts the retries for the period for the selected application. In one embodiment, this is accomplished by retrieving the retry log 38 contained within retry log database 30 coupled to starter module 26.

At step 312, starter module 26 determines whether the number of retries specified in the retry log 38 associated with the selected application 14 exceeds a limit of retries specified for that application 14. If it is determined that the retries exceed such limit, starter module 26 sends the retry log 38, for example, via e-mail, to a system administrator at step 314. The system administrator may then take appropriate action, such as revising the code or downloading a new copy of the application 14 into the computer system. Starter module 26 then returns to step 308 where it determines whether any other applications 14 should be considered for starting.

Referring again to step 312, if it is determined that the number of retries does not exceed the specified limit for the selected application 14, starter module 26 determines at step 316 whether a check-in entry 22 exists (within check-in database 28) for the application 14. The presence of a check-in entry 22 indicates that the application 14 is already running, and consequently does not need to be started. Thus, if it is determined that a check-in entry 22 does exist, starter module 26 returns to step 308 where it determines whether additional applications 14 should be considered for starting.

Otherwise, if it is determined at step 316 that a check-in entry 22 does not exist for the application 14, starter module 26 starts the application 14 at step 318. At step 320, starter module 26 logs the start as a retry in the appropriate retry log 38 maintained in retry log database 30. Starter module 26 then returns to step 308 where it determines whether additional applications 14 should be considered.

Starter module 26 repeats steps 308–320 until it has considered each application 14 specified in configuration information 40 for the computer 12 on which starter module 26 operates.

In the manner described above, the present invention starts or restarts each application 14 on a computer 12 at as needed, or, alternatively, notifies a human operator if appropriate.

Although the present invention and its advantages have been described in detail, it should be understood that various changes, substitutions, and alterations, can be made therein without departing from the spirit and scope of the invention as defined by the appended claims.

What is claimed is:

1. A system for maintaining applications in a computer system, the maintenance system comprising:

a database operable to store a check-in entry associated with an application, wherein the check-in entry comprises executable deactivator coding operable to deactivate the associated application; and a processor coupled to the database, the processor operable to determine whether a check-in time for the application associated with the check-in entry is later than a specified time, the processor further operable to deactivate the application associated with the check-in entry if the check-in time is later than the specified time.

2. The maintenance system of claim 1, wherein the check-in entry further comprises starter coding which, when executed, ensures that only one copy of that application is running on a particular computer at a particular time.

3. The maintenance system of claim 2, wherein the processor is operable to execute the deactivator coding.

4. The maintenance system of claim 1, wherein the check-in entry comprises a time stamp specifying the check-in time for the associated application.

5. The maintenance system of claim 1, wherein the processor is further operable to start the application if the application is not currently running on the computer system.

6. The maintenance system of claim 1, wherein the database is further operable to store configuration information specifying a check-in interval for the application.

7. A system for maintaining applications in a computer system, the maintenance system comprising:

a database operable to store a check-in entry associated with an application and configuration information for the application, and wherein the check-in entry comprises executable deactivator coding operable to deactivate the associated application and starter coding which, when executed, ensures that only one copy of that application is running on a particular computer at a particular time; and a processor coupled to the database, the processor operable to determine whether a check-in time for the application associated with the check-in entry is later than a specified time, deactivate the application associated with the check-in entry if the check-in time is later than the specified time, and start the application associated with the check-in entry if the application is not running.

8. The maintenance system of claim 7, wherein the processor is further operable to generate a retry log for the application, the retry log specifying each time that the processor starts the application.

9. The maintenance system of claim 7, wherein the configuration information specifies a predetermined limit of starts for the application, and wherein the processor is further operable to determine whether a number of times at which the application has been started during a specified time interval exceeds the predetermined limit of starts for the application.

10. The maintenance system of claim 9, wherein the processor is further operable to notify a system administrator if a number of times at which the application has been started during the specified time interval exceeds the predetermined limit of starts for the application.

11. The maintenance system of claim 7, wherein the database is further operable to store a retry log for the application.

12. A method for maintaining applications in a computer system, the method comprising the steps of:

generating a check-in entry associated with an application, wherein the check-in entry comprises executable deactivator coding operable to deactivate the associated application; and deactivating the application associated with the check-in entry if a check-in time for the application is later than a specified time.

13. The method of claim 12, further comprising the step of storing the check-in entry in a check-in database.

14. The method of claim 12, further comprising the step of determining whether the check-in time for the application is later than the specified time.

15. The method of claim 14, wherein the check-in entry comprises a time stamp, and wherein the step of determining comprises the step of reviewing the time stamp.

16. The method of claim 12, wherein the check-in entry further comprises starter coding which, when executed, ensures that only one copy of that application is running on a particular computer at a particular time, and wherein the step of deactivating comprises the step of executing the deactivator coding.

17. The method of claim 12, further comprising the step of starting the application if the application is not currently running on the computer system.

18. The method of claim 17, further comprising the step of generating a retry log for the application, the retry log specifying each time that the application is started.

19. The method of claim 17, further comprising the step of determining whether a number of times at which the application has been started during a specified time interval exceeds a predetermined limit of starts for the application.

20. The method of claim 19, further comprising the step of notifying a system administrator if a number of times at which the application has been started during a specified time interval exceeds a predetermined limit of starts for the application.

* * * * *